Sept. 25, 1923.
J. E. ADDY
1,468,620
HOSE ELEVATING AND SUPPORTING DEVICE
Filed July 18, 1922
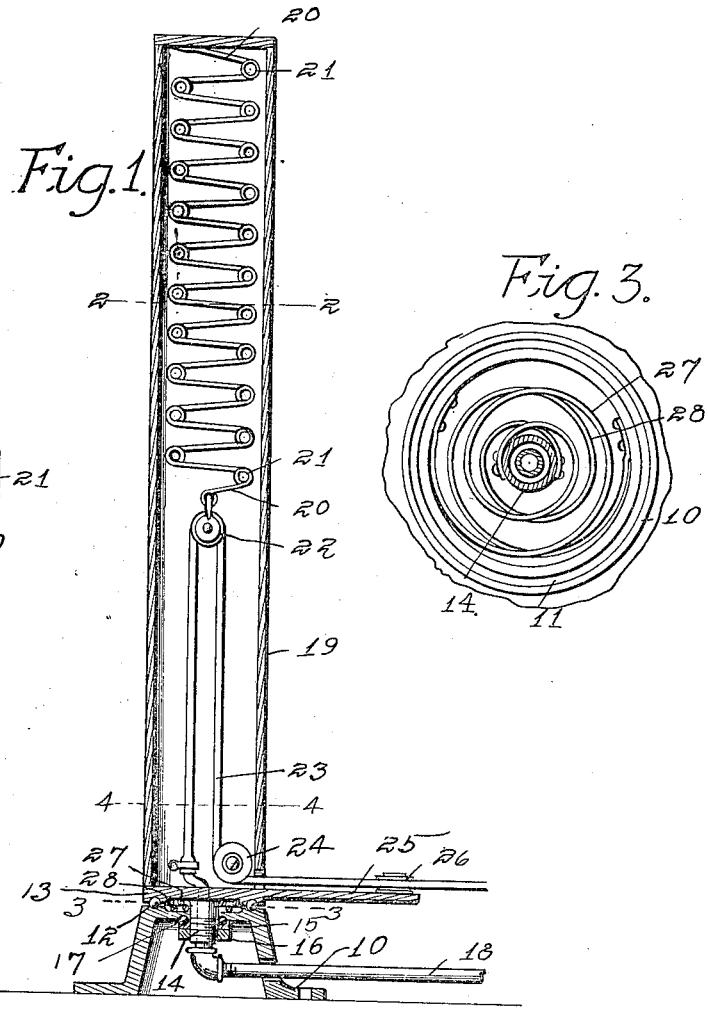
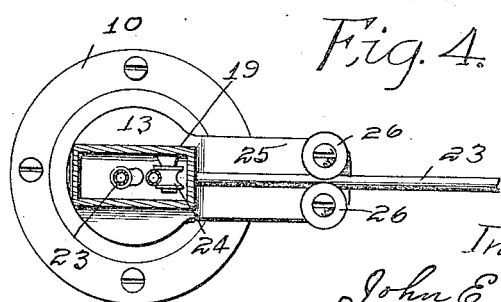
Inventor
John E. Addy
by Orwig & Hague Att'ys Patented Sept. 25, 1923.

1,468,620

UNITED STATES PATENT OFFICE.

JOHN E. ADDY, OF WINTERSET, IOWA.

HOSE ELEVATING AND SUPPORTING DEVICE.

Application filed July 18, 1922. Serial No. 575,900.

*To all whom it may concern:*

Be it known that I, JOHN E. ADDY, a citizen of the United States, and a resident of Winterset, in the county of Madison and State of Iowa, have invented a certain new and useful Hose Elevating and Supporting Device, of which the following is a specification.

The object of my invention is to provide a hose elevating and supporting device of simple, durable and inexpensive construction especially designed for use in connection with a hose for conducting air under pressure for use in inflating pneumatic tires.

More specifically it is my object to provide a device of this character which may be permanently located at a point conveniently accessible to automobiles on all sides and which, when in a normal position, will cause the air hose to be supported almost wholly within its interior and in an untangled condition free from kinks, with the discharge end of the hose projected to a point conveniently accessible to the operator, and when it is desired to use the hose, it is only necessary to grasp the discharge end thereof and pull it outwardly away from the support, or in a direction at any desired angle relative to the support, and after it has been used, the operator may simply drop the discharge end of the pipe and it will automatically be withdrawn into the holder in proper condition and the holder will be automatically rotated to its original position.

A further object is to provide an improved form of hose elevating spring capable of a maximum degree of expansion, and also capable of contracting within a minimum space, and especially adapted for use in combination with the other elements of my device in connection with an air hose.

My invention consists in the construction, arrangement and combination of the various parts of the device, whereby the objects contemplated are attained, as hereinafter more fully set forth, pointed out in my claims, and illustrated in the accompanying drawings, in which:

Figure 1 shows a vertical, central, sectional view of a device embodying my invention, with the air hose in a partly withdrawn position.

Figure 2 shows a horizontal, sectional view on the line 2—2 of Figure 1.

Figure 3 shows a sectional view on the line 3—3 of Figure 1; and

Figure 4 shows a sectional view on the line 4—4 of Figure 1.

Referring to the accompanying drawings, I have used the reference numeral 10 to indicate a base or support designed to be fixed in a stationary position. At its upper end there is an annular groove 11 designed to receive bearing balls 12.

Mounted on the top of the base 10 is a rotatable plate 13 having an annular groove on its bottom designed to receive the bearing balls 12 to form a rotary ball bearing for the plate 13.

Extended downwardly from the plate 13 is a pipe 14 which also extends through the top of the base 10, and screwed to this pipe is a ball bearing plate 15 secured by an adjustable nut 16, and designed to receive bearing balls 17 which also engage the under surface of the base.

Extended through the base and through the plate 14 is a metal air supply pipe 18.

By means of the construction just described, it is obvious that the said plate 13 may freely rotate on ball bearings, and yet be held against movement in any other than a rotary direction.

Mounted on top of the plate 13 is a hollow standard 19, preferably rectangular in cross section, as shown in Figure 2. At the top of this standard is fixed a spring, which spring comprises a series of arms 20 and coils 21. The coils normally standing adjacent to the opposite edges of the interior of the standard 19, as clearly shown in Figure 1. Attached to the lower one of the arms 20 is a pulley 22.

Connected with the supply pipe 18 is a flexible air hose 23 which extends upwardly and over the pulley 22, and then downwardly and under a pulley 24, and then outwardly through an opening in the standard, and above an arm 25 which is fixed to the rotary plate 13, and this arm has at its outer end two grooved pulleys 26 through which the hose 23 is extended.

Mounted between the base 10 and the rotary plate 13 are two coil springs 27 and 28, each of which is fixed at its outer end to the base and at its inner end to the tube 14, and said springs are coiled in opposite directions so they oppose each other.

By this arrangement, when the arm 25 is rotated part of a revolution in one direction, one of said springs will be wound up and the other will be unwound. Hence when the arm 25 is released, the particular spring that was brought under tension will cause the arm to be returned to its normal position, and this is true whether the arm 25 is rotated in one direction or the other.

In practical operation, and assuming that the device is assembled ready for use, then the operator grasps the discharge end of the air hose and pulls it outwardly as far as is necessary to reach the tire to be blown up. This may be drawn out until the pulley 22 is at its lower limit of movement adjacent to the pulley 24, and substantially the full length of the hose is projected from the standard. At the same time the hose may be moved either to the right or to the left by simply pulling it in the desired direction, and when this is done, the arm 25 will serve as a lever and the air hose will bear against one or the other of the pulleys 26, and this will rotate the standard so that the hose may be drawn out from the standard at any desired angle relative to the stationary base, so that automobiles on any side of the standard may be readily and easily served, and when in any position of its rotary movement the air hose may be freely withdrawn or drawn up into the standard.

When the air hose is released, then each of the coils 21 in the supporting frame tends to return to its normal position, and this will cause the pulley 22 to be elevated to a point relatively near the top of the standard, and substantially all of the hose will be drawn thereby up into the standard.

Furthermore, by means of this improved form of spring, the spring may be extended to a point near the bottom of the standard when pressure is applied to draw the air hose out.

I claim as my invention:

1. In a device of the class described, the combination of a standard, an air hose introduced into the base of the standard and extended up into the standard and then downwardly and then out through the standard to a point on the exterior of the standard where it may be grasped, a spring device secured to the top of the standard and comprising alternate straight arms and coiled members, and a pulley connected with the lower one of the straight arm members of the spring and having said hose running over it, for the purposes stated.

2. In a device of the class described, the combination of a base designed to be secured to a stationary support, a plate rotatably mounted on top of the base, an arm extended outwardly from the base, grooved pulleys mounted on said arm, a yielding pressure device tending to return the arm to a normal position when it has been rotated in either direction from its normal position, a standard mounted upon the rotary plate, a pulley within the standard, a spring device fixed to the top of the standard and connected to the said pulley to normally elevate the pulley, and an air hose communicating with a source of compressed air supply and passed upwardly over said pulley and then downwardly and out through the standard and between the pulleys on said arm, substantially as and for the purposes stated.

Des Moines, Iowa, June 23, 1922.

JOHN E. ADDY.